(12) United States Patent
Melanson et al.

(10) Patent No.: US 8,008,902 B2
(45) Date of Patent: Aug. 30, 2011

(54) HYSTERETIC BUCK CONVERTER HAVING DYNAMIC THRESHOLDS

(75) Inventors: John L. Melanson, Austin, TX (US); Lei Ding, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 541 days.

(21) Appl. No.: 12/145,807

(22) Filed: Jun. 25, 2008

(65) Prior Publication Data
US 2009/0322300 A1  Dec. 31, 2009

(51) Int. Cl.
*G05F 1/42* (2006.01)
(52) U.S. Cl. .................................... 323/285; 363/56.11
(58) Field of Classification Search .................. 323/205, 323/207, 222, 282–288; 363/16–20, 97
See application file for complete search history.

(56) References Cited

U.S. PATENT DOCUMENTS

| | | | |
|---|---|---|---|
| 3,316,495 A | 4/1967 | Sherer | |
| 3,423,689 A | 1/1969 | Miller et al. | |
| 3,586,988 A | 6/1971 | Weekes | |
| 3,725,804 A | 4/1973 | Langan | |
| 3,790,878 A | 2/1974 | Brokaw | |
| 3,881,167 A | 4/1975 | Pelton et al. | |
| 4,075,701 A | 2/1978 | Hofmann | |
| 4,334,250 A | 6/1982 | Theus | |
| 4,414,493 A | 11/1983 | Henrich | |
| 4,476,706 A | 10/1984 | Hadden et al. | |
| 4,677,366 A | 6/1987 | Wilkinson et al. | |
| 4,683,529 A | 7/1987 | Bucher | |
| 4,697,210 A | 9/1987 | Toyota et al. | |
| 4,700,188 A | 10/1987 | James | |
| 4,737,658 A | 4/1988 | Kronmuller et al. | |
| 4,797,633 A | 1/1989 | Humphrey | |
| 4,940,929 A | 7/1990 | Williams | |
| 4,973,919 A | 11/1990 | Allfather | |
| 4,979,087 A | 12/1990 | Sellwood et al. | |
| 4,992,919 A | 2/1991 | Lee et al. | |
| 4,994,952 A | 2/1991 | Silva et al. | |

(Continued)

FOREIGN PATENT DOCUMENTS

EP  1014563  6/2000

(Continued)

OTHER PUBLICATIONS

"AN-H52 Application Note: HV9931 Unity Power Factor LED Lamp Driver" Mar. 7, 2007, Supertex Inc., Sunnyvale, CA, USA.

(Continued)

*Primary Examiner* — Rajnikant B Patel
(74) *Attorney, Agent, or Firm* — Mitch Harris, Atty at Law, LLC; Andrew M. Harris

(57) ABSTRACT

A hysteretic buck converter provides improved regulation control, in particular for buck converter standby operation. A comparison circuit compares the output voltage of the buck converter to a waveform that is generated from an indication of the output current of the converter, so that the turn-on time of the converter is advanced as the output current demand increases. The resulting action anticipates a reduction in output voltage due to the increased current, preventing an excursion of the output voltage below the ripple voltage minimum. The turn-off time of the converter is controlled by an upper threshold that limits the ripple voltage maximum. The output current indication may be a measurement of output current, or may be a dynamic value calculated from the input voltage and the output voltage waveform.

24 Claims, 4 Drawing Sheets

U.S. PATENT DOCUMENTS

| | | | |
|---|---|---|---|
| 5,206,540 A | 4/1993 | de Sa e Silva et al. | |
| 5,278,490 A | 1/1994 | Smedley | |
| 5,323,157 A | 6/1994 | Ledzius et al. | |
| 5,359,180 A | 10/1994 | Park et al. | |
| 5,383,109 A | 1/1995 | Maksimovic et al. | |
| 5,424,932 A | 6/1995 | Inou et al. | |
| 5,477,481 A | 12/1995 | Kerth | |
| 5,479,333 A | 12/1995 | McCambridge et al. | |
| 5,481,178 A | 1/1996 | Wilcox et al. | |
| 5,565,761 A | 10/1996 | Hwang | |
| 5,589,759 A | 12/1996 | Borgato et al. | |
| 5,638,265 A | 6/1997 | Gabor | |
| 5,691,890 A | 11/1997 | Hyde | |
| 5,747,977 A | 5/1998 | Hwang | |
| 5,757,635 A | 5/1998 | Seong | |
| 5,764,039 A | 6/1998 | Choi et al. | |
| 5,781,040 A | 7/1998 | Myers | |
| 5,783,909 A | 7/1998 | Hochstein | |
| 5,798,635 A | 8/1998 | Hwang et al. | |
| 5,834,858 A | 11/1998 | Crosman, III et al. | |
| 5,900,683 A | 5/1999 | Rinehart et al. | |
| 5,929,400 A | 7/1999 | Colby et al. | |
| 5,946,202 A | 8/1999 | Balogh | |
| 5,952,849 A | 9/1999 | Haigh | |
| 5,960,207 A | 9/1999 | Brown | |
| 5,963,086 A | 10/1999 | Hall | |
| 5,966,297 A | 10/1999 | Minegishi | |
| 5,994,885 A | 11/1999 | Wilcox et al. | |
| 6,016,038 A | 1/2000 | Mueller et al. | |
| 6,043,633 A | 3/2000 | Lev et al. | |
| 6,072,969 A | 6/2000 | Yokomori et al. | |
| 6,083,276 A | 7/2000 | Davidson et al. | |
| 6,084,450 A | 7/2000 | Smith et al. | |
| 6,150,774 A | 11/2000 | Mueller et al. | |
| 6,181,114 B1 | 1/2001 | Hemena et al. | |
| 6,211,626 B1 | 4/2001 | Lys et al. | |
| 6,211,627 B1 | 4/2001 | Callahan | |
| 6,229,271 B1 | 5/2001 | Liu | |
| 6,229,292 B1 * | 5/2001 | Redl et al. | 323/285 |
| 6,246,183 B1 | 6/2001 | Buonavita | |
| 6,259,614 B1 | 7/2001 | Ribarich et al. | |
| 6,300,723 B1 | 10/2001 | Wang et al. | |
| 6,304,066 B1 | 10/2001 | Wilcox et al. | |
| 6,304,473 B1 | 10/2001 | Telefus et al. | |
| 6,344,811 B1 | 2/2002 | Melanson | |
| 6,385,063 B1 | 5/2002 | Sadek et al. | |
| 6,407,691 B1 | 6/2002 | Yu | |
| 6,441,558 B1 | 8/2002 | Muthu et al. | |
| 6,445,600 B2 | 9/2002 | Ben-Yaakov | |
| 6,452,521 B1 | 9/2002 | Wang et al. | |
| 6,495,964 B1 | 12/2002 | Muthu et al. | |
| 6,509,913 B2 | 1/2003 | Martin, Jr. et al. | |
| 6,580,258 B2 | 6/2003 | Wilcox et al. | |
| 6,583,550 B2 | 6/2003 | Iwasa et al. | |
| 6,628,106 B1 | 9/2003 | Batarseh et al. | |
| 6,636,003 B2 | 10/2003 | Rahm et al. | |
| 6,646,848 B2 | 11/2003 | Yoshida et al. | |
| 6,688,753 B2 | 2/2004 | Calon et al. | |
| 6,713,974 B2 | 3/2004 | Patchornik et al. | |
| 6,724,174 B1 * | 4/2004 | Esteves et al. | 323/224 |
| 6,727,832 B1 | 4/2004 | Melanson | |
| 6,741,123 B1 | 5/2004 | Andersen et al. | |
| 6,753,661 B2 | 6/2004 | Muthu et al. | |
| 6,768,655 B1 | 7/2004 | Yang et al. | |
| 6,781,351 B2 | 8/2004 | Mednik et al. | |
| 6,788,011 B2 | 9/2004 | Mueller et al. | |
| 6,806,659 B1 | 10/2004 | Mueller et al. | |
| 6,839,247 B1 | 1/2005 | Yang et al. | |
| 6,860,628 B2 | 3/2005 | Robertson et al. | |
| 6,870,325 B2 | 3/2005 | Bushell et al. | |
| 6,873,065 B2 | 3/2005 | Haigh et al. | |
| 6,882,552 B2 | 4/2005 | Telefus et al. | |
| 6,888,322 B2 | 5/2005 | Dowling et al. | |
| 6,894,471 B2 | 5/2005 | Corva et al. | |
| 6,933,706 B2 | 8/2005 | Shih | |
| 6,940,733 B2 | 9/2005 | Schie et al. | |
| 6,944,034 B1 | 9/2005 | Shteynberg et al. | |
| 6,956,750 B1 | 10/2005 | Eason et al. | |
| 6,958,920 B2 | 10/2005 | Mednik et al. | |
| 6,967,448 B2 | 11/2005 | Morgan et al. | |
| 6,970,503 B1 | 11/2005 | Kalb | |
| 6,975,079 B2 | 12/2005 | Lys et al. | |
| 6,975,523 B2 | 12/2005 | Kim et al. | |
| 6,980,446 B2 | 12/2005 | Simada et al. | |
| 7,003,023 B2 | 2/2006 | Krone et al. | |
| 7,050,509 B2 | 5/2006 | Krone et al. | |
| 7,064,498 B2 | 6/2006 | Dowling et al. | |
| 7,064,531 B1 | 6/2006 | Zinn | |
| 7,075,329 B2 | 7/2006 | Chen et al. | |
| 7,078,963 B1 | 7/2006 | Andersen et al. | |
| 7,088,059 B2 | 8/2006 | McKinney et al. | |
| 7,102,902 B1 | 9/2006 | Brown et al. | |
| 7,106,603 B1 | 9/2006 | Lin et al. | |
| 7,109,791 B1 | 9/2006 | Epperson et al. | |
| 7,126,288 B2 | 10/2006 | Ribarich et al. | |
| 7,135,824 B2 | 11/2006 | Lys et al. | |
| 7,145,295 B1 | 12/2006 | Lee et al. | |
| 7,158,573 B2 | 1/2007 | Hershbarger | |
| 7,158,633 B1 | 1/2007 | Hein | |
| 7,161,816 B2 | 1/2007 | Shteynberg et al. | |
| 7,183,957 B1 | 2/2007 | Melanson | |
| 7,212,640 B2 | 5/2007 | Bizjak | |
| 7,221,130 B2 | 5/2007 | Ribeiro et al. | |
| 7,233,135 B2 | 6/2007 | Noma et al. | |
| 7,246,919 B2 | 7/2007 | Porchia et al. | |
| 7,255,457 B2 | 8/2007 | Ducharm et al. | |
| 7,266,001 B1 | 9/2007 | Notohamiprodjo et al. | |
| 7,272,585 B2 | 9/2007 | Nomura et al. | |
| 7,288,902 B1 | 10/2007 | Melanson | |
| 7,289,054 B1 | 10/2007 | Watanabe | |
| 7,292,013 B1 | 11/2007 | Chen et al. | |
| 7,310,244 B2 | 12/2007 | Yang et al. | |
| 7,331,226 B2 | 2/2008 | Feldman et al. | |
| 7,345,458 B2 | 3/2008 | Kanai et al. | |
| 7,375,476 B2 | 5/2008 | Walter et al. | |
| 7,382,635 B2 | 6/2008 | Noda | |
| 7,511,437 B2 | 3/2009 | Lys et al. | |
| 7,538,499 B2 | 5/2009 | Ashdown | |
| 7,545,130 B2 | 6/2009 | Latham | |
| 7,554,473 B2 | 6/2009 | Melanson | |
| 7,569,996 B2 | 8/2009 | Holmes et al. | |
| 7,656,103 B2 | 2/2010 | Shteynberg et al. | |
| 2002/0145041 A1 | 10/2002 | Muthu et al. | |
| 2002/0150151 A1 | 10/2002 | Krone et al. | |
| 2002/0166073 A1 | 11/2002 | Nguyen et al. | |
| 2003/0095013 A1 | 5/2003 | Melanson et al. | |
| 2003/0174520 A1 | 9/2003 | Bimbaud | |
| 2003/0223255 A1 | 12/2003 | Ben-Yaakov | |
| 2004/0004465 A1 | 1/2004 | McGinnis | |
| 2004/0046683 A1 | 3/2004 | Mitamura et al. | |
| 2004/0085030 A1 | 5/2004 | Laflamme et al. | |
| 2004/0085117 A1 | 5/2004 | Melbert et al. | |
| 2004/0169477 A1 | 9/2004 | Yancie et al. | |
| 2004/0227571 A1 | 11/2004 | Kuribayashi | |
| 2004/0228116 A1 | 11/2004 | Miller et al. | |
| 2004/0232971 A1 | 11/2004 | Kawasaki et al. | |
| 2004/0239262 A1 | 12/2004 | Ido et al. | |
| 2005/0057237 A1 | 3/2005 | Clavel | |
| 2005/0156770 A1 | 7/2005 | Melanson | |
| 2005/0184895 A1 | 8/2005 | Petersen et al. | |
| 2005/0207190 A1 | 9/2005 | Gritter | |
| 2005/0253533 A1 | 11/2005 | Lys et al. | |
| 2005/0270813 A1 | 12/2005 | Zhang et al. | |
| 2005/0275354 A1 | 12/2005 | Hausman et al. | |
| 2005/0275386 A1 | 12/2005 | Jepsen et al. | |
| 2006/0022916 A1 | 2/2006 | Aiello | |
| 2006/0023002 A1 | 2/2006 | Hara et al. | |
| 2006/0125420 A1 | 6/2006 | Boone et al. | |
| 2006/0226795 A1 | 10/2006 | Walter et al. | |
| 2006/0238136 A1 | 10/2006 | Johnson, III et al. | |
| 2006/0261754 A1 | 11/2006 | Lee | |
| 2006/0285365 A1 | 12/2006 | Huynh et al. | |
| 2007/0029946 A1 | 2/2007 | Yu et al. | |
| 2007/0040512 A1 | 2/2007 | Jungwirth et al. | |
| 2007/0053182 A1 | 3/2007 | Robertson | |
| 2007/0103949 A1 | 5/2007 | Tsuruya | |
| 2007/0124615 A1 | 5/2007 | Orr | |

| | | |
|---|---|---|
| 2007/0182699 A1 | 8/2007 | Ha et al. |
| 2007/0231009 A1 | 10/2007 | Watahiki |
| 2008/0130322 A1 | 6/2008 | Artusi et al. |
| 2008/0174372 A1 | 7/2008 | Tucker et al. |
| 2008/0192509 A1 | 8/2008 | Dhuyvetter et al. |
| 2008/0224635 A1 | 9/2008 | Hayes |
| 2008/0232141 A1 | 9/2008 | Artusi et al. |
| 2008/0259655 A1 | 10/2008 | Wei et al. |
| 2008/0278132 A1 | 11/2008 | Kesterson et al. |
| 2009/0147544 A1 | 6/2009 | Melanson |
| 2009/0190384 A1 | 7/2009 | Thompson |
| 2009/0191837 A1 | 7/2009 | Nanda et al. |
| 2009/0218960 A1 | 9/2009 | Lyons et al. |

FOREIGN PATENT DOCUMENTS

| | | |
|---|---|---|
| EP | 1164819 | 12/2001 |
| EP | 1213823 | 6/2002 |
| EP | 1528785 | 5/2005 |
| EP | 1768257 A1 | 3/2007 |
| GB | 2069269 | 8/1981 |
| GB | 2262673 A | 6/1993 |
| WO | WO 91/13417 | 9/1991 |
| WO | WO 97/42714 | 11/1997 |
| WO | WO 01/15316 | 1/2001 |
| WO | WO 01/84697 | 11/2001 |
| WO | WO 01/97384 | 12/2001 |
| WO | WO 02/15386 | 2/2002 |
| WO | WO 02/27944 | 4/2002 |
| WO | WO 02/091805 | 11/2002 |
| WO | WO 2006/067521 | 6/2006 |
| WO | WO 2006/135584 | 12/2006 |
| WO | WO 2007/026170 | 3/2007 |
| WO | WO 2007/079362 | 7/2007 |

OTHER PUBLICATIONS

A. Prodic, Compensator Design and Stability Assessment for Fast Voltage Loops of Power Factor Correction Rectifiers, IEEE Transactions on Power Electronics, vol. 22, No. 5, Sep. 2007.
A. R. Seidel et al., A Practical Comparison Among High-Power-Factor Electronic Ballasts with Similar Ideas, IEEE Transactions on Industry Applications, vol. 41, No. 6, Nov.-Dec. 2005.
A. Silva De Morais et al., A High Power Factor Ballast Using a Single Switch with Both Power Stages Integrated, IEEE Transactions on Power Electronics, vol. 21, No. 2, Mar. 2006.
Abramovitz et al., "A Resonant DC-DC Transformer With Zero Current Ripple", IEEE Transactions on Power Electronics, Nov. 2007, p. 2344-2351, vol. 22, No. 6.
AZOTEQ, IQS17 Family, IQ Switch®—ProxSense™ Series, Touch Sensor, Load Control and User Interface, IQS17 Datasheet V2.00. doc, Jan. 2007.
B.A. Miwa et al., High Efficiency Power Factor Correction Using Interleaved Techniques, Applied Power Electronics Conference and Exposition, Seventh Annual Conference Proceedings, Feb. 23-27, 1992.
Barragan et al., "Efficiency Optimization in ZVS Series Resonant Inverters With Asymmetrical Voltage-Cancellation Control", IEEE Transactions on Power Electronics, Sep. 2005, p. 1036-1044, vol. 20, No. 5.
Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.
Bhat et al., "Analysis and Design of a High-Frequency Resonant Converter Using LCC-Type Commutation", IEEE Transactions on Power Electronics, Oct. 1987, p. 291-301, vol. PE-2 No. 4.
Burr_Brown, "Transformer Coupled Isolation Amplifier", BB3656 Datasheet, Tucson, AZ, 1987.
Burr-Brown, ISO120 and ISO121, "Precision Los Cost Isolation Amplifier," Tucson AZ, Mar. 1992.
Burr-Brown, ISO130, "High IMR, Low Cost Isolation Amplifier," SBOS220, US, Oct. 2001.
C. Dilouie, Introducing the LED Driver, EC&M, Sep. 2004.
C. M. De Oliviera Stein et al., A ZCT Auxiliary Communication Circuit for Interleaved Boost Converters Operating in Critical Conduction Mode, IEEE Transactions on Power Electronics, vol. 17, No. 6, Nov. 2002.
Chen et al., "Generalized Optimal Trajectory Control for Closed Loop Control of Series-Parallel Resonant Converter", IEEE Transactions on Power Electronics, Sep. 2006, p. 1347-1355, vol. 21, No. 5.
Chromacity Shifts in High-Power White LED Systems due to Different Dimming Methods, Solid-State Lighting, http://www.lrc.rpi.edu/programs/solidstate/completedProjects.asp?ID=76, printed May 3, 2007.
Color Temperature, www.sizes.com/units/color_temperature.htm, printed Mar. 27, 2007.
D. Hausman, Lutron, RTISS-TE Operation, Real-Time Illumination Stability Systems for Trailing-Edge (Reverse Phase Control) Dimmers, v. 1.0 Dec. 2004.
D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.
D. Maksimovic et al., "Switching Converters with Wide DC Conversion Range," Institute of Electrical and Electronic Engineers (IEEE) Transactions on Power Electronics, Jan. 1991.
D.K.W. Cheng et al., A New Improved Boost Converter with Ripple Free Input Current Using Coupled Inductors, Power Electronics and Variable Speed Drives, Sep. 21-23, 1998.
Dallas Semiconductor, Maxim, "Charge-Pump and Step-Up DC-DC Converter Solutions for Powering White LEDs in Series or Parallel Connections," Apr. 23, 2002.
De Groot et al., "Design of a 1-MHz LLC Resonant Converter Based on a DSP-Driven SOI Half-Bridge Power MOS Module", IEEE Transactions on Power Electronics, Nov. 2007, p. 2307-2320, vol. 22 No. 4.
Dustin Rand et al: "Issues, Models and Solutions for Triac Modulated Phase Dimming of LED Lamps" Power Electronics Specialists Conference, 2007. PESC 2007. IEEE, IEEE, P1, Jun. 1, 2007, pp. 1398-1404.
F. T. Wakabayashi et al., An Improved Design Procedure for LCC Resonant Filter of Dimmable Electronic Ballasts for Fluorescent Lamps, Based on Lamp Model, IEEE Transactions on Power Electronics, vol. 20, No. 5, Sep. 2005.
Fairchild Semiconductor, Application Note 42030, Theory and Application of the ML4821 Average Current Mode PFC Controller, Oct. 25, 2000.
Fairchild Semiconductor, Application Note 42030, Theory and Application of the ML4821 Average Current Mode PFC Controller, Aug. 1997.
Fairchild Semiconductor, Application Note 42047 Power Factor Correction (PFC) Basics, Rev. 0.9.0 Aug. 19, 2004.
Fairchild Semiconductor, Application Note 6004, 500W Power-Factor-Corrected (PFC) Converter Design with FAN4810, Rev. 1.0.1, Oct. 31, 2003.
Fairchild Semiconductor, Application Note AN4121, Design of Power Factor Correction Circuit Using FAN7527B, Rev.1.0.1, May 30, 2002.
Fairchild Semiconductor, FAN4800, Low Start-up Current PFC/PWM Controller Combos, Nov. 2006.
Fairchild Semiconductor, FAN4810, Power Factor Correction Controller, Sep. 24, 2003.
Fairchild Semiconductor, FAN4822, ZVA Average Current PFC Controller, Rev. 1.0.1 Aug. 10, 2001.
Fairchild Semiconductor, FAN4822, ZVS Average Current PFC Controller, Aug. 10, 2001.
Fairchild Semiconductor, FAN7527B, Power Factor Correction Controller, 2003.
Fairchild Semiconductor, FAN7532, Ballast Controller, Rev. 1.0.2, Jun. 2006.
Fairchild Semiconductor, FAN7711, Ballast Control IC, Rev. 1.0.2, Mar. 2007.
Fairchild Semiconductor, ML4812, Power Factor Controller, Rev. 1.0.4, May 31, 2001.
Fairchild Semiconductor, ML4821, Power Factor Controller, Jun. 19, 2001.
Fairchild Semiconductor, ML4821, Power Factor Controller, Rev. 1.0.2, Jun. 19, 2001.
Feng, et al. "Ultra Fast Fixed-Frequency Hysteretic Buck Converter With Maximum Charging Current Control and Adaptive Delay Compensation for DVS Applications", IEEE JSSC, IEEE Press, New Jersey, Nov. 2001.
Foster et al., "Cyclic-Averaging for High Speed Analysis of Resonant Converters", IEEE Transactions on Power Electronics, Jul. 2003, p. 985-993, vol. 18, No. 4.

Freescale Semiconductor, AN1965, Design of Indirect Power Factor Correction Using 56F800/E, Jul. 2005.
Freescale Semiconductor, AN3052, Implementing PFC Average Current Mode Control Using the MC9S12E128, Nov. 2005.
Freescale Semiconductor, Inc., Dimmable Light Ballast with Power Factor Correction, Design Reference Manual, DRM067, Rev. 1, Dec. 2005.
G. Yao et al., Soft Switching Circuit for Interleaved Boost Converters, IEEE Transactions on Power Electronics, vol. 22, No. 1, Jan. 2007.
Gu, et al, "Three-Level LLC Series Resonant DC/DC Converter," IEEE Transactions on Power Electronics, vol. 20, No. 4, p. 781-789, Jul. 2005.
H. L. Cheng et al., A Novel Single-Stage High-Power-Factor Electronic Ballast with Symmetrical Topology, IEEE Transactions on Power Electronics, vol. 50, No. 4, Aug. 2003.
H. Peng et al., Modeling of Quantization Effects in Digitally Controlled DC-DC Converters, IEEE Transactions on Power Electronics, vol. 22, No. 1, Jan. 2007.
H. Wu et al., Single Phase Three-Level Power Factor Correction Circuit with Passive Lossless Snubber, IEEE Transactions on Power Electronics, vol. 17, No. 6, Nov. 2002.
Hattrup et al., "Fast Estimation Techniques for Digital Control of Resonant Converters", IEEE Transactions on Power Electronics, Jan. 2003, p. 365-372, vol. 18, No. 1.
Infineon, CCM-PFC Standalone Power Factor Correction (PFC) Controller in Continuous Conduction Mode (CCM), Version 2.1, Feb. 6, 2007.
International Rectifier, Application Note AN-1077,PFC Converter Design with IR1150 One Cycle Control IC, rev. 2.3, Jun. 2005.
International Rectifier, Data Sheet No. PD60230 revC, IR1150(S)(PbF), uPFC One Cycle Control PFC IC Feb. 5, 2007.
International Rectifier, Data Sheet PD60230 revC, Feb. 5, 2007.
International Rectifier, IRAC1150-300W Demo Board, Users Guide, Rev 3.0, Aug. 2, 2005.
Intersil, "Designing with the ISL6752, ISL6753 ZVS Full-Bridge Controllers," Application Note AN1262.0, Aug. 15, 2006.
Intersil, AN1262.0, "Designing with the ISL6752, ISL6753 ZVS Full-Bridge Controllers", Aug. 2006.
J. A. Vilela Jr. et al., An Electronic Ballast with High Power Factor and Low Voltage Stress, IEEE Transactions on Industry Applications, vol. 41, No. 4, Jul./Aug. 2005.
J. Qian et al., Charge Pump Power-Factor-Correction Technologies Part II: Ballast Applications, IEEE Transactions on Power Electronics, vol. 15, No. 1, Jan. 2000.
J. Qian et al., New Charge Pump Power-Factor-Correction Electronic Ballast with a Wide Range of Line Input Voltage, IEEE Transactions on Power Electronics, vol. 14, No. 1, Jan. 1999.
J. Turchi, Four Key Steps to Design a Continuous Conduction Mode PFC Stage Using the NCP1653, on Semiconductor, Publication Order No. AND184/D, Nov. 2004.
J. Zhou et al., Novel Sampling Algorithm for DSP Controlled 2 kW PFC Converter, IEEE Transactions on Power Electronics, vol. 16, No. 2, Mar. 2001.
J.W.F. Dorleijn et al., Standardisation of the Static Resistances of Fluorescent Lamp Cathodes and New Data for Preheating, Industry Applications Conference, vol. 1, Oct. 13, 2002-Oct. 18, 2002.
K. Leung et al., "Dynamic Hysteresis Band Control of the Buck Converter with Fast Transient Response," IEEE Transactions on Circuits and Systems—II: Express Briefs, vol. 52, No. 7, Jul. 2005.
K. Leung et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.
K.M. Smedley, One-Cycle Control of Switching Converters, IEEE Transactions on Power Electronics, vol. 10, No. 6, Nov. 1995.
L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7, 1993-Mar. 11, 1993.
L. Gonthier et al., EN55015 Compliant 500W Dimmer with Low-Losses Symmetrical Switches, 2005 European Conference on Power Electronics and Applications, Sep. 2005.

Laouamri et al., "Modeling and Analysis of Wound Integrated LCT Structure for Single Stage Resonant PFC Rectifier", IEEE Transactions on Power Electronics, Jan. 2003, p. 256-269, vol. 18, No. 1.
Light Dimmer Circuits, www.epanorama.net/documents/lights/lightdimmer.html, printed Mar. 26, 2007.
Light Emitting Diode, http://en.wikipedia.org/wiki/Light-emitting_diode, printed Mar. 27, 2007.
Lilei Gu et al., "Three-Level LLC Series Resonant DC/DC Converter", IEEE Transactions on Power Electronics, Jul. 2005, p. 781-789, vol. 20, No. 4.
Lin et al., "Robust Controller Design for a Series Resonant Converter via Duty-Cycle Control", IEEE Transactions on Power Electronics, Sep. 1999, p. 793-802, vol. 14 No. 5.
Linear Technology, 100 Watt LED Driver, Linear Technology, 2006.
Linear Technology, LT1248, Power Factor Controller, Apr. 20, 2007.
Linear Technology, News Release,Triple Output LED, LT3496, Linear Technology, Milpitas, CA, May 24, 2007.
Lu, et al, "Quasi Current Mode Control for the Phase-Shifted Series Resonant Converter," IEEE Transactions on Power Electronics, vol. 23, No. 1, p. 353-358, Jan. 2008.
M. K. Kazimierczuk et al., Electronic Ballast for Fluorescent Lamps, IEEE Transactions on Power Electronics, vol. 8, No. 4, Oct. 1993.
M. Madigan et al., Integrated High-Quality Rectifier-Regulators, IEEE Transactions on Industrial Electronics, vol. 46, No. 4, Aug. 1999.
M. Ponce et al., High-Efficient Integrated Electronic Ballast for Compact Fluorescent Lamps, IEEE Transactions on Power Electronics, vol. 21, No. 2, Mar. 2006.
M. Radecker et al., Application of Single-Transistor Smart-Power IC for Fluorescent Lamp Ballast, Thirty-Fourth Annual Industry Applications Conference IEEE, vol. 1, Oct. 3, 1999-Oct. 7, 1999.
M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.
Mammano, B., Resonant Mode Converter Topologies, Texas Instruments, 2001.
Mangat et al., "A Modified Asymmetrical Pulse-Width-Modulated Resonant DC/DC Converter Topology", IEEE Transactions on Power Electronics, Jan. 2004, p. 104-111, vol. 19, No. 1.
Megaman, D or S Dimming ESL, Product News, Mar. 15, 2007.
National Lighting Product Information Program, Specifier Reports, "Dimming Electronic Ballasts," vol. 7, No. 3, Oct. 1999.
Noon, Jim "UC3855A/B High Performance Power Factor Preregulator", Texas Instruments, SLUA146A, May 1996,Revised Apr. 2004.
NXP, TEA1750, GreenChip III SMPS control IC Product Data Sheet, Apr. 6, 2007.
O. Garcia et al., High Efficiency PFC Converter to Meet EN61000-3-2 and A14, Proceedings of the 2002 IEEE International Symposium on Industrial Electronics, vol. 3, 2002.
On Semconductor, NCP1606, Cost Effective Power Factor Controller, Mar. 2007.
On Semiconductor, AND8123/D, Power Factor Correction Stages Operating in Critical Conduction Mode, Sep. 2003.
On Semiconductor, MC33260, GreenLine Compact Power Factor Controller: Innovative Circuit for Cost Effective Solutions, Sep. 2005.
On Semiconductor, NCP1605, Enhanced, High Voltage and Efficient Standby Mode, Power Factor Controller, Feb. 2007.
On Semiconductor, NCP1654, Product Review, Power Factor Controller for Compact and Robust, Continuous Conduction Mode Pre-Converters, Mar. 2007.
P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.
P. Lee et al., Steady-State Analysis of an Interleaved Boost Converter with Coupled Inductors, IEEE Transactions on Industrial Electronics, vol. 47, No. 4, Aug. 2000.
Power Integrations, Inc., "TOP200-4/14 TOPSwitch Family Three-terminal Off-line PWM Switch", XP-002524650, Jul. 1996, Sunnyvale, California.

Power Supply Design Tutorial, SMPS Block Diagram, Basic Concepts, Theory of Operation, http://www.smps.us/power-supply.html, printed Aug. 11, 2008.

Q. Li et al., An Analysis of the ZVS Two-Inductor Boost Converter under Variable Frequency Operation, IEEE Transactions on Power Electronics, vol. 22, No. 1, Jan. 2007.

Renesas Technology Releases Industry's First Critical-Conduction-Mode Power Factor Correction Control IC Implementing Interleaved Operation, Dec. 18, 2006.

Renesas, Application Note R2A20111 EVB, PFC Control IC R2A20111 Evaluation Board, Feb. 2007.

Renesas, HA16174P/FP, Power Factor Correction Controller IC, Jan. 6, 2006.

S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.

S. Chan et al., Design and Implementation of Dimmable Electronic Ballast Based on Integrated Inductor, IEEE Transactions on Power Electronics, vol. 22, No. 1, Jan. 2007.

S. Lee et al., A Novel Electrode Power Profiler for Dimmable Ballasts Using DC Link Voltage and Switching Frequency Controls, IEEE Transactions on Power Electronics, vol. 19, No. 3, May 2004.

S. Lee et al., TRIAC Dimmable Ballast with Power Equalization, IEEE Transactions on Power Electronics, vol. 20, No. 6, Nov. 2005.

S. Skogstad et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization.pdf.

S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.

S. Zhou et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.

Spiazzi G et al: "Analysis of a High-Power Factor Electronic Ballast for High Brightness Light Emitting Diodes" Power Electronics Specialists, 2005 IEEE 36th Conference on June 12, 2005, Piscatawa, NJ, USA, IEEE, Jun. 12, 2005, pp. 1494-1499.

ST Microelectronics, AN993, Application Note, Electronic Ballast with PFC Using L6574 and L6561, May 2004.

ST Microelectronics, L6574, CFL/TL Ballast Driver Preheat and Dimming, Sep. 2003.

ST Microelectronics, Power Factor Corrector L6561, Jun. 2004.

STmicroelectronics, L6563, Advanced Transition-Mode PFC Controller, Mar. 2007.

Supertex Inc., 56W Off-line LED Driver, 120VAC with PFC, 160V, 350mA Load, Dimmer Switch Compatible, DN-H05, Feb. 2007.

Supertex Inc., Buck-based LED Drivers Using the HV9910B, Application Note AN-H48, Dec. 28, 2007.

Supertex Inc., HV9931 Unity Power Factor LED Lamp Driver, Application Note AN-H52, Mar. 7, 2007.

T. Wu et al., Single-Stage Electronic Ballast with Dimming Feature and Unity Power Factor, IEEE Transactions on Power Electronics, vol. 13, No. 3, May 1998.

Texas Instruments, BiCMOS Advanced Phase-Shift PWM Controller Datasheet, Dec. 1999, Rev. Apr. 2008.

Texas Instruments, "BiCMOS Advanced Phase-Shift PWM Controller Datasheet," UCC1895, UCC2895, UCC3895, Dec. 1999, Rev. Apr. 2008.

Texas Instruments, Application Note SLUA321, Startup Current Transient of the Leading Edge Triggered PFC Controllers, Jul. 2004.

Texas Instruments, Application Report SLUA308, UCC3817 Current Sense Transformer Evaluation, Feb. 2004.

Texas Instruments, Application Report SLUA369B, 350-W, Two-Phase Interleaved PFC Pre-Regulator Design Review, Mar. 2007.

Texas Instruments, Application Report SPRA902A, Average Current Mode Controlled Power Factor Correctiom Converter using TMS320LF2407A, Jul. 2005.

Texas Instruments, Application Report, SLUA309A, Avoiding Audible Noise at Light Loads when using Leading Edge Triggered PFC Converters, Sep. 2004.

Texas Instruments, SLOS318F, "High-Speed, Low Noise, Fully-Differential I/O Amplifiers," THS4130 and THS4131, US, Jan. 2006.

Texas Instruments, SLUS828B, "8-Pin Continuous Conduction Mode (CCM) PFC Controller", UCC28019A, US, revised Apr. 2009.

Texas Instruments, Transition Mode PFC Controller, SLUS515D, Jul. 2005.

Texas Instruments, UCC3817 BiCMOS Power Factor Preregulator Evaluation Board Users Guide, Nov. 2002.

Tuomainen et al., "Effect of Resonant Transition on Efficiency of Forward Converter with Active Clamp and Self-Driven SRs", IEEE Transactions on Power Electronics, Mar. 2005, p. 315-323, vol. 20, No. 2.

Unitrode Products From Texas Instruments, BiCMOS Power Factor Preregulator, Feb. 2006.

Unitrode Products From Texas Instruments, High Performance Power Factor Preregulator, Oct. 2005.

Unitrode Products From Texas Instruments, Programmable Output Power Factor Preregulator, Dec. 2004.

Unitrode, Design Note DN-39E, Optimizing Performance in UC3854 Power Factor Correction Applications, Nov. 1994.

Unitrode, High Power-Factor Preregulator, Oct. 1994.

Unitrode, L. Balogh, Design Note UC3854A/B and UC3855A/B Provide Power Limiting with Sinusoidal Input Current for PFC Front Ends, SLUA196A, Nov. 2001.

V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.

Vishwanathan, et al, "High Voltage DC Power Supply Topology for Pulsed Load Applications with Converter Switching Synchronized to Load Pulses," Power Electronics Group, Bangalore, India, Nov. 2003, vol. 1.

W. Zhang et al., A New Duty Cycle Control Strategy for Power Factor Correction and FPGA Implementation, IEEE Transactions on Power Electronics, vol. 21, No. 6, Nov. 2006.

Wong, et al., "Steady-state Analysis of Hysteretic Control Buck Converters", Power Electronics and Motion Control Conference, IEEE Press, New Jersey, Sep. 2008.

Xie et al., "Analysis and Optimization of LLC Resonant Converter With a Novel Over-Current Protection Circuit", IEEE Transactions on Power Electronics, Mar. 2007, p. 435-443, vol. 22 No. 2.

Y. Ji et al., Compatibility Testing of Fluorescent Lamp and Ballast Systems, IEEE Transactions on Industry Applications, vol. 35, No. 6, Nov./Dec. 1999.

Yan Lu et al., "Quasi Current Mode Control for the Phase-Shifting Series Resonant Converter", IEEE Transactions on Power Electronics, Jan. 2008, p. 353-358, vol. 23 No. 1.

Ye et al., "A Robust One-Cycle Controlled Full-Bridge Series-Parallel Resonant Inverter for a High Frequency AC (HFAC) Distribution System", IEEE Transactions on Power Electronics, Nov. 2007, p. 2331-2343, vol. 22, No. 6.

Z. Lai et al., A Family of Power-Factor-Correction Controllers, Twelfth Annual Applied Power Electronics Conference and Exposition, vol. 1, Feb. 23, 1997-Feb. 27, 1997.

Zhao, et al. "Steady-state and Dynamic Analysis of a Buck Converter Using a Hysteretic PWM Control", Power Electronics Specialists Conference, IEEE Press, New Jersey, Jun. 2004.

Zie, et al, "Analysis and Optimization of LLC Resonant Converter with a Novel Over-Current Protection Circuit," IEEE Transactions on Power Electronics, vol. 22, No. 2, p. 435-443, Mar. 2007.

L6562 Datasheet, "Transition-Mode PFC Controller", ST Microelectronics, Nov. 2005, Geneva, Switzerland.

Mamano, Bob, "Current Sensing Solutions for Power Supply Designers", Unitrode Seminar Notes SEM1200, 1999.

Texas Instruments, Interleaving Continuous Conduction Mode PFC Controller, UCC28070, SLUS794C, Nov. 2007, revised Jun. 2009, Texas Instruments, Dallas TX.

* cited by examiner

HYSTERETIC BUCK CONVERTER HAVING DYNAMIC THRESHOLDS

BACKGROUND OF THE INVENTION

1. Field of the Invention

The present invention relates generally to hysteretic buck converter control schemes, and more specifically, to a buck converter control circuit in which an indication of output current is used to adjust turn-on timing dynamically.

2. Background of the Invention

At low output current levels, pulse width modulator (PWM) controllers and other types of switching power regulators that deliver high current levels under high load conditions are inefficient. Since the pulse width becomes very narrow for low output current levels, the power used to operate the switching circuits and control/sensing circuits, which does not typically change with load current demand, predominates converter power consumption, making the converter very inefficient during low demand conditions. Alternative controller modes are frequently implemented to operate the converter in a standby low power mode, in which the full converter dynamic performance is not available, but a minimum output voltage is maintained to provide required power supply voltage(s) when the load current demand is low. Pulse-frequency modulator (PFM) circuits are frequently used in low power operating modes, as the pulse frequency can be arbitrarily reduced based upon load demand. Hysteretic control circuits, in which the output voltage is maintained between two predetermined set points, have been applied to provide such low-power operating modes. Hysteretic converters have a wide dynamic range and potentially low power consumption, due to their activation only when the output voltage falls below an acceptable limit.

Also, in low power applications in which either the complexity or the power required for PWM operation is undesirable, hysteretic controllers are sometimes used to provide the power supply control algorithm for all levels of output current, since the control circuit itself can be placed entirely in standby mode, with the low-limit voltage sensing circuit being the only circuit required to operate. The output of the low-limit voltage sensing circuit can then activate the remainder of the converter when the output voltage must be raised. Further, in any application in which the transient response of a PWM converter is not sufficiently fast for responding to load transients, hysteretic converters are also used to provide a fast response to changing load conditions.

In typical hysteretic converters, a constant-width pulse is provided when the output voltage falls below a low-limit threshold, injecting a charge into the output capacitor that raises the output voltage by a predetermined amount. However, if the output current or input voltage conditions are changing, such a converter can produce an undesirable level of ripple, as the constant-width pulse is not responsive to different levels of load current or input voltage. In other types of hysteretic converters, the input voltage and other power supply conditions are monitored and the width of the output pulse is controlled so that the level of ripple is controlled to a greater degree than the constant-width controllers can provide.

However, each of the above hysteretic controllers, load transients or input voltage droop can cause undershoot of the low-limit threshold due to time required for the converter to respond. In the constant-width converter, several pulses may be required for the output voltage to recover and in the width-controlled hysteretic converter, an initial undershoot is present, which is corrected by the pulse that has been triggered.

Therefore, it would be desirable to provide a power supply circuit and control method that reduce ripple in a hysteretic converter by controlling undershoot.

SUMMARY OF THE INVENTION

The above stated objective of controlling undershoot in a hysteretic converter is provided in a buck switching voltage regulator circuit and a method of operation of the buck switching voltage regulator circuit.

The buck switching voltage regulator circuit provides improved ripple control by anticipating the magnitude of the ripple due to load current changes. The circuit may be a control circuit active in a standby mode of a switching regulator, such as a PWM regulator that uses a PWM control mode during higher current output demand and enters standby mode during lower current output demand conditions. A comparison circuit compares the output voltage of the converter to a waveform that is generated from an indication of the output current of the converter, so that the turn-on time of the converter is advanced as the output current demand increases and the lower voltage limit is adjusted to prevent undershoot below a specified lower ripple voltage limit. The turn-off time of the converter is controlled by an upper threshold that limits the ripple voltage maximum. The output current indication may be a measurement of output current, or may be a value calculated from the input voltage and the output voltage waveform.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses circuits and methods for providing control of a buck switching voltage regulator, in which ripple undershoot is prevented by controlling the turn-on threshold in conformity with an indication of the output current drawn by a load. The output current indication can be provided by measuring the output current directly, or as will be shown in the following description, can be calculated from the output voltage waveform and the value of the input voltage.

Figure 1A:
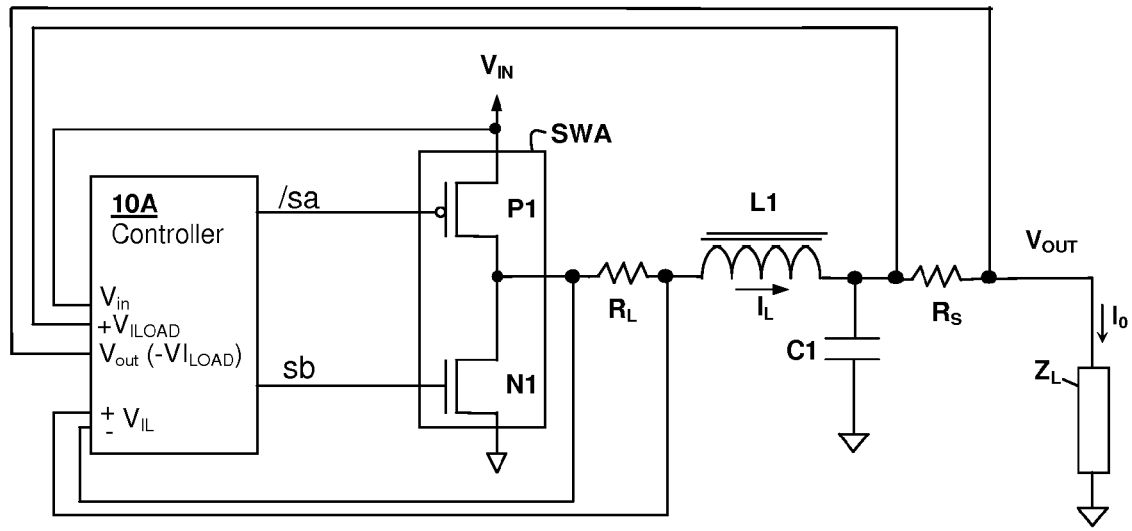
FIGS. 1A-1B are block diagrams depicting power switching circuits in accordance with embodiments of the present invention.

Referring now to FIG. 1A, a buck switching voltage regulator circuit in conformity with an embodiment of the invention is shown. A control circuit, controller 10A provides gate drive signals to a switching circuit SWA that couples an inductor L1 in series between an input voltage source $V_{IN}$ and output terminal $V_{OUT}$, when transistor P1 is activated by control signal/sa. Switching circuit SWA couples inductor L1 in shunt between output terminal $V_{OUT}$ and a common return path (ground) associated with input voltage source $V_{IN}$ and output terminal $V_{OUT}$, when transistor N1 is activated by control signal sb. Output capacitor C1 filters the output of the buck switching voltage regulator circuit, so that the voltage generated at output terminal $V_{OUT}$ is held substantially constant, except for a ripple voltage. At low demand, i.e., for low load current $I_L$ supplied to a load $Z_L$, controller 10A operates in discontinuous conduction mode (DCM), first activating transistor P1 to charge output capacitor C1 through inductor L1, then deactivating transistor P1 and activating transistor N1 to discharge energy stored in inductor L1 onto capacitor, and then finally deactivating transistor N1 until the voltage of output terminal $V_{OUT}$ falls below a threshold magnitude. At higher levels of load current $I_L$, controller 10A may operate in continuous conduction mode (CCM) as a hysteretic converter, or may transition directly to another CCM control algorithm, such as pulse-width modulation (PWM). Even if CCM operation is implemented for the hysteretic operation of the converter, PWM or other operation modes may be initiated after a range of load current $I_L$ is exceeded for which hysteretic CCM operation is used.

In the buck switching voltage regulator of the present invention, the threshold magnitude used to determine the turn-on time of transistor P1 is a time-varying waveform generated from an indication of the output current provided from output terminal $V_{out}$ to a load and from the magnitude of the input voltage provided from voltage source $V_{IN}$, so that as the output current increases or the input voltage decreases, the time at which transistor P1 is activated occurs earlier in time and as the output current decreases or the input voltage increases, the time at which transistor P1 is activated occurs later in time. The threshold magnitude is computed from an indication of the output current, which may be a measurement of the output current generated by a sense resistor $R_s$, which provides a voltage +$V_{ILOAD}$ that differs from the output terminal $V_{out}$ voltage in proportion to load current $I_o$. (For illustrative purposes $V_{out}$ is also designated as –$V_{ILOAD}$.) Controller 10A computes the turn-off time of transistor P1, which is also the turn-on time of transistor N1, from the input voltage provided by voltage source $V_{IN}$ and the voltage of output terminal $V_{OUT}$, so that the ripple voltage at output terminal $V_{out}$ does not exceed a specified maximum. Finally the turn-off time for transistor N1 can be controlled by the current $I_L$ provided through inductor L to capacitor C1 as measured by the voltage (+/–$V_{IL}$) across resistor $R_L$ reaching a zero or a slightly negative value, to ensure there is no residual energy stored in inductor L.

Figure 1B:
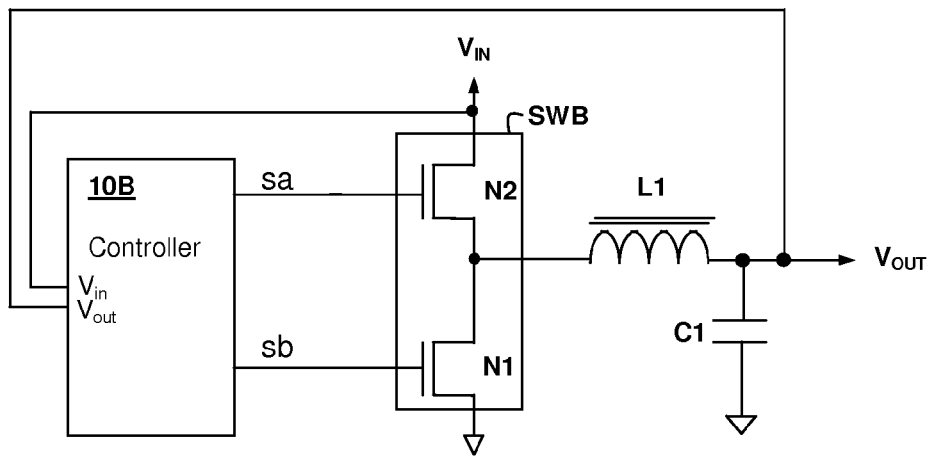

Referring now to FIG. 1B, a buck switching voltage regulator in accordance with another embodiment of the invention is shown. The buck switching voltage regulator of FIG. 1B is similar to that of the buck switching voltage regulator of FIG. 1A, so only differences between them will be described below. Further, various features in buck switching voltage regulator of FIG. 1B can be used as alternatives for features illustrated in the buck switching voltage regulator of FIG. 1A, and vice-versa. Switching circuit SWB uses two N-type transistors N2 and N1 and receives corresponding gate control signals sa and sb from a controller 10B. An N-channel pair can also be used in the buck switching voltage regulator of FIG. 1A, with appropriate change in the polarity of gate control signal/sa. Controller 10B receives only two control input values: the voltage of input source $V_{IN}$, and the voltage of output terminal $V_{OUT}$. Controller 10B performs all switch control in conformity with the two control input signal values ($V_{out},V_{in}$), provided by respective input source $V_{IN}$ and from output terminal $V_{OUT}$, to generate gate control signals sa and sb. A P-N switching stage such as switching circuit SWA as illustrated in FIG. 1A can be used with appropriate change to the polarity of gate control signal sa. Since the output current is related to the voltage waveform of output terminal $V_{OUT}$ and the voltage of voltage source $V_{IN}$, the turn-on time of transistor N1 can be determined from the two input control signal values ($V_{out},V_{in}$) as will be described in further detail below.

Figure 2A:
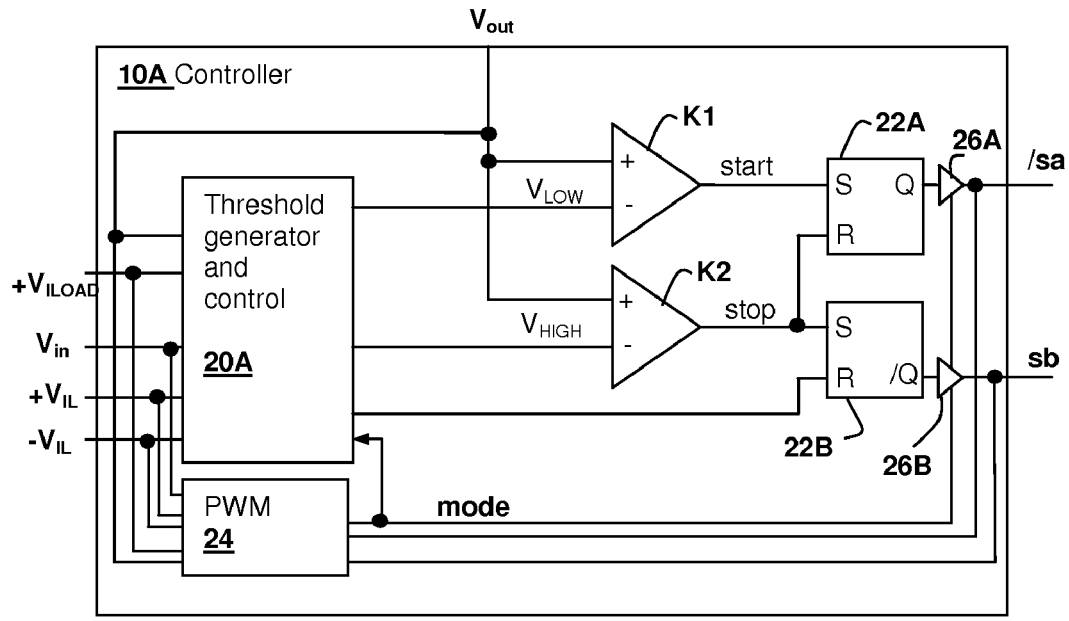
FIG. 2A is a simplified schematic diagram of control circuit 10A of FIG. 1A.

Referring now to FIG. 2A, details of controller 10A of FIG. 1A are shown. A pair of tri-state buffers, 26A and 26B are activated by a control signal mode provided by PWM controller 24, when load current $I_0$ falls below a threshold, or alternatively when PWM controller 24 is placed in standby mode via an external control signal. When control signal mode is active, the gate control outputs of PWM 24 are placed in a high-impedance state, so that the hysteretic controller implemented by the balance of circuits within controller 10A provides gate control output signals/sa and sb. A threshold generator and control circuit 20A provides a threshold voltage to a comparator K1, which sets a threshold magnitude (voltage signal $V_{low}$) below which input control signal $V_{out}$ activates a start signal, which triggers the beginning edge of gate control signal/sa by activating the set input of flip-flop 22A. When the magnitude of input control signal $V_{out}$ rises above another threshold voltage $V_{HIGH}$, another comparator K2 activates the reset input of flip-flop 22A and the set input of a flip-flop 22B, which triggers the trailing edge of gate control signal/sa and the leading edge of gate control signal sb. Threshold generator and control circuit 20A also provides a control signal to the reset input of flip-flop 22B, to trigger the trailing edge of gate control signal sb, when inductor current $I_L$ falls below a zero or slightly negative value.

Figure 2B:
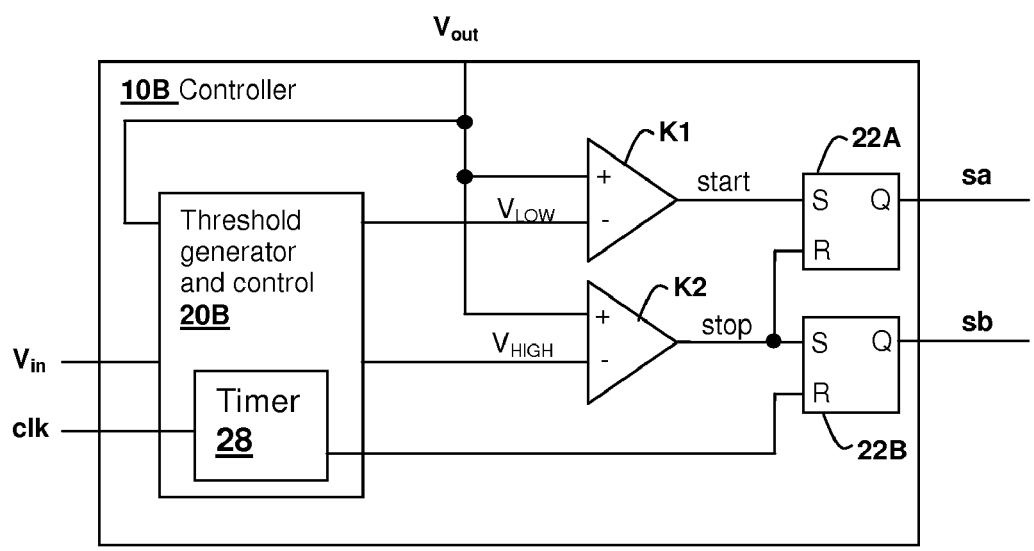
FIG. 2B is a simplified schematic diagram of control circuit 10B of FIG. 1B.

Referring now to FIG. 2B, details of controller 10B of FIG. 1B are shown. Controller 10B is similar to controller 10A of FIG. 2A, so only differences between them will be described below. Controller 10B is provided as an example of a minimum-input controller, and also exemplifies a controller that provides all control in hysteretic mode. However, it is understood that the minimum-input configuration can be used in standby modes with another controller type, such as PWM controller 24, illustrated in FIG. 2A. Threshold generator and control circuit 20B receives control input signals ($V_{out},V_{in}$) and generates threshold voltages $V_{LOW}$ and $V_{HIGH}$ by calculating them from control input signals ($V_{out},V_{in}$) as will be described in further detail below. A timer 28 is provided, which will generally be a counter chain operated from a clock signal, to time the duration of gate control signal sa, for use in calculating an appropriate width of gate control signal sb, since controller 20B does not directly measure inductor current $I_L$.

Figure 3A:
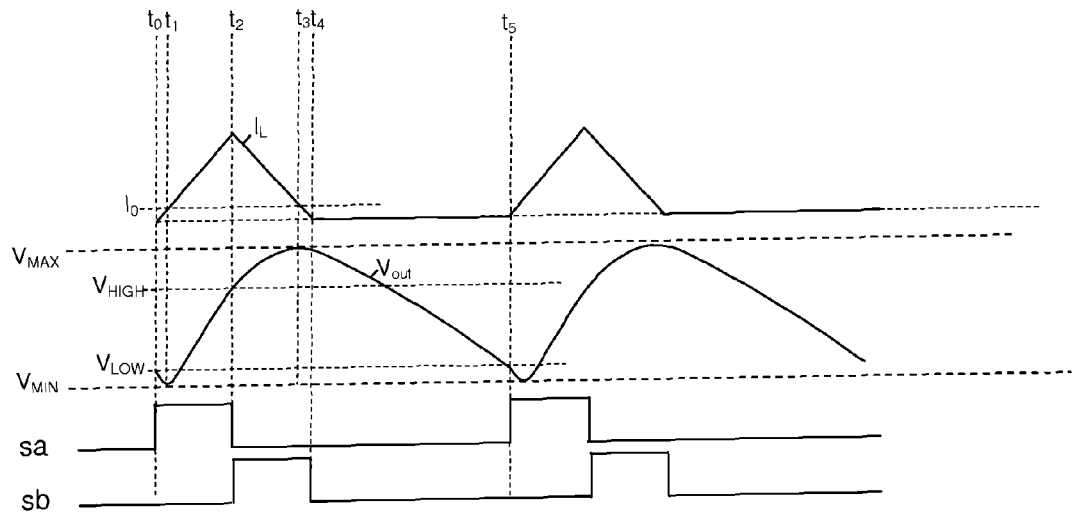
FIG. 3A is a signal waveform diagram illustrating calculations performed within threshold generator and control circuit 20A of FIG. 2A and threshold generator and control circuit 20B of FIG. 2B, in discontinuous conduction mode (DCM).

With reference now to FIG. 3A, calculations within threshold generator and control circuit 20A of FIG. 2A and threshold generator and control circuit 20B of FIG. 2B are illustrated for discontinuous conduction mode (DCM). The value of threshold voltage magnitude $V_{LOW}$ required to ensure that the ripple on output terminal $V_{OUT}$ does not fall below a specified minimum $V_{MIN}$ can be determined either using a measured value for output current $I_0$ as illustrated in control circuit 20A of FIG. 2A or by using an indication of output current $I_0$ calculated from control signal values ($V_{in}$, $V_{out}$) as illustrated in control circuit 20B of FIG. 2B. Assuming that output terminal voltage $V_{OUT}$ is constant, while gate control signal sa is active, inductor current $I_L$ can be approximated as $$I_L(t)=(V_{in}-V_{out})(t-t_0)/L,$$

where L is the inductance of inductor L1, and therefore at time $t_1$.

$$I_L(t_1)=I_0=(V_{in}-V_{out})(t_1-t_0)/L$$

Therefore, $$t_1-t_0=I_0L/(V_{in}-V_{out})$$

The actual voltage droop on output terminal $V_{OUT}$ from time $t_0$ to time $t_1$, assuming a linear inductor current $I_L$, is given by $$\Delta V=I_L\Delta t/2C,$$

where C is the total output capacitance at output terminal $V_{OUT}$. To maintain the voltage at output terminal $V_{OUT}$ above minimum voltage $V_{MIN}$, gate control signal sa should be activated no later than the time at which control signal $V_{out}$ falls to a threshold level $$V_{LOW}=V_{MIN}+\Delta V=V_{MIN}+I_0(t_1-t_0)/2C$$

Since $$t_1-t_0=I_0L/(V_{in}-V_{out})$$

in the above approximation for constant inductor current $I_L$, threshold magnitude $V_{LOW}$ can be calculated as $$V_{LOW}=I_0^2L/2C(V_{in}-V_{out})$$

Therefore, once the values of the inductor and capacitor are known, a waveform for threshold voltage $V_{LOW}$ can be determined from the input voltage signal $V_{in}$ and control signal $V_{out}$ and the load current $I_L$, since at the time threshold magnitude $V_{LOW}$ is crossed, $I_L(t_1)=I_0$.

To determine the load current used to calculate threshold magnitude $V_{LOW}$ from $V_{LOW}=I_0^2L/2C\,(V_{in}-V_{out})$, the load current can be measured directly, or by estimation. Since the voltage change across capacitor C1 from time $t_0$ to time $t_2$ is $V_{HIGH}-V_{LOW}$, the charge added to the capacitor can be expressed as $$C(V_{HIGH}-V_{LOW})=[(V_{in}-V_{out})(t_2-t_0)^2]/2L-I_0(t_2-t_0)$$

and current $I_0$ can therefore be expressed as $$I_0=[(V_{in}-V_{out})(t_2-t_0)]/2L-C(V_{HIGH}-V_{LOW})/(t_2-t_0)$$

By measuring the time (e.g., counting clock periods) between the time that the charging switch (e.g., transistor P1 of FIG. 1A or transistor N2 of FIG. 1B) is on, $I_0$ can be calculated and used as an estimate of inductor current $I_L$, since the difference between them is generally small except under very light load conditions. Alternatively, $I_0$ can be calculated from the time period extending from time $t_2$ to time $t_5$ according to:

$$C(V_{HIGH}-V_{LOW})=(V_{in}-V_{out})(t_4-t_2)^2/2L-I_0(t_5-t_2)$$

which leads to:

$$I_0=V_{out}(t_4-t_2)^2/2L(t_5-t_2)-C\,(V_{HIGH}-V_{LOW})/(t_5-t_2)$$

To determine the magnitude $V_{HIGH}$ of the voltage on output terminal $V_{OUT}$ at which gate control signal sa should be de-asserted and gate control signal sb asserted, another calculation is performed. The voltage at output terminal $V_{OUT}$ at time $t_2$, at which $V_{OUT}=V_{HIGH}$ is $V_{MAX}-Q(t_3-t_2)/C$, where $Q(t_3-t_2)$ is the total charge added to capacitor C1 after gate control signal sa is de-asserted and gate control signal sb is asserted, which is equal to $V_{MAX}-(I_{MAX}-I_0)(t_3-t_2)/2C$, where maximum current $I_{MAX}$ is the peak inductor current. Therefore, setting $$V_{HIGH}=V_{MAX}-(I_{MAX}-I_0)(t_3-t_2)/2C$$

will provide the desired switching time. Threshold magnitude $V_{HIGH}$ can also be expressed in terms of $V_{MIN}$:

$$V_{HIGH}=V_{MIN}+(I_{MAX}-I_0)(t_2-t_1)/2C$$

The peak current, $I_{MAX}$, can be determined from $$I_{MAX}=I_0+(V_{in}-V_{out})(t_2-t_1)/L$$

and $$I_{MAX}=I_0+V_{out}(t-t_2)/L,$$

which assume that the output voltage is not changing substantially, and that the inductor current is constant during the charging and discharging. Therefore, $$(V_{in}-V_{out})(t_2-t_1)/L=V_{out}(t_3-t_2)/L,$$

which leads to:

$$t_3-t_2=(t_2-t_1)(V_{in}-V_{out})/V_{out}$$

The above expression for $t_3-t_2$ can be substituted in the above expression for $V_{HIGH}$, yielding:

$$V_{HIGH}=V_{MAX}-[(I_{MAX}-I_0)(t_2-t_1)(V_{in}-V_{out})]/2CV_{out}$$

$I_{MAX}-I_0$ can be determined from the expression for threshold magnitude $V_{HIGH}$ in terms of minimum voltage $V_{MIN}$ to yield:

$$I_{MAX}-I_0=2C(V_{HIGH}-V_{MIN})/(t_2-t_1)$$

Finally, combining the last two equations yields:

$$V_{HIGH}=V_{MAX}-(V_{HIGH}-V_{MIN})(V_{in}-V_{out})/V_{out}$$

and therefore $$V_{HIGH}=V_{MIN}+(V_{MAX}-V_{MIN})V_{out}/V_{in}$$

The above expression can be used to produce or calculate a value for threshold magnitude $V_{HIGH}$ as a discrete value based on previous values of control signals $V_{in}$ and $V_{out}$ or to generate a continuous waveform to control the upper threshold magnitude.

Figure 3B:
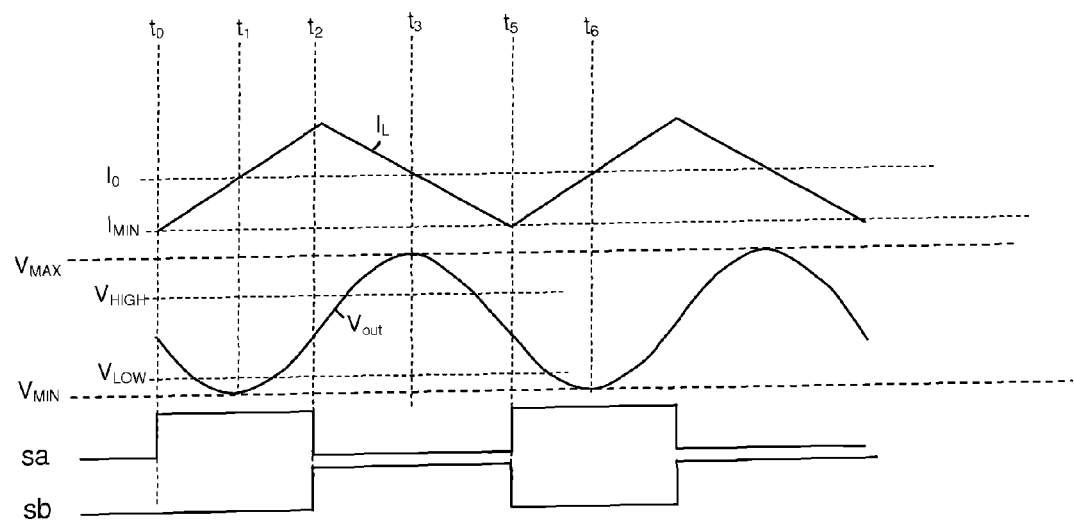
FIG. 3B is a signal waveform diagram illustrating calculations performed within threshold generator and control circuit 20A of FIG. 2A and threshold generator and control circuit 20B of FIG. 2B, in continuous conduction mode (CCM).

In each of the above calculations, it was assumed that the circuit is operating in DCM, i.e., operating such that all of the energy stored in inductor L1 is discharged at times $t_0$ and $t_5$. However, under higher load conditions, the circuit of the present invention can operate in continuous conduction mode (CCM) and for optimum operation, the computation of the lower threshold magnitude $V_{LOW}$ is changed. However, the computation of the upper threshold magnitude $V_{HIGH}$ is the same as in the above description. Referring now to FIG. 3B, such operation is illustrated. In the signal diagram of FIG. 3B time $t_4$ is absent, because there is no significant period of time for which both switching transistors (charging and discharging) are off. In continuous conduction mode, assuming that output voltage $V_0$ is constant, $$dI_L/dt=(V_{in}-V_{out})/L$$

after the charging transistor (e.g., transistor P1 of FIG. 1A or transistor N2 of FIG. 1B) is turned on, given a lower current $I_{MIN}$, which is the initial non-zero current value at the turn-on time, then $$I_L(t)=(V_{in}-V_{out})(t-t_0)/L+I_{MIN}$$

which according to the above definition of $I_0=I_L(t)$ for discontinuous conduction mode, leads to:

$$t-t_0=(I_0-I_{MIN})L/(V_{in}-V_{out})$$

Therefore, in order to ensure that the voltage of output terminal $V_{OUT}$ does not fall below minimum voltage $V_{MIN}$, threshold magnitude $V_{LOW}$ should be set to:

$$V_{LOW}=V_{MIN}+L(I_0-I_{MIN})^2/2C(V_{in}-V_{out})$$

To determine the load current in CCM, as described above for DCM, the load current can be measured directly, or by estimation. Since the voltage change across capacitor C1 from time $t_0$ to time $t_2$ is $V_{HIGH}-V_{LOW}$, the charge added to the capacitor can be expressed as $$C(V_{HIGH}-V_{LOW})=(V_{in}-V_{out})(t_2-t_0)^2/2L-(I_0-I_{MIN})(t_2-t_0)$$

and $I_0-I_{MIN}$ can be expressed as $$I_0-I_{MIN}=(V_{in}-V_{out})(t_2-t_0)/2L-C(V_{HIGH}-V_{LOW})/(t_2-t_0)$$

which is the same as the expression for $I_0$ in DCM. Since the required quantity for determining $V_{LOW}$ above is $I_0-I_{MIN}$, the same computation can be used for estimating the value of $I_0-I_{MIN}$ in CCM that was used to estimate $I_0$ in DCM. The alternative expression based upon the time period from time $t_2$ to time $t_4$ may also alternatively be used, as follows:

$$I_0-I_{MIN}=V_{out}(t_4-t_2)^2/2L(t_3-t_2)-C(V_{HIGH}-V_{LOW})/(t_5-t_2)$$

In CCM, it is possible to further optimize the control of threshold magnitude $V_{LOW}$. Since, for the time period between time $t_5$ and time $t_6$, the total charge lost from capacitor C1 is given by:

$$(I_0-I_{MIN})(t_6-t_5)/2$$

Lower threshold magnitude $V_{LOW}$ is therefore given by:

$$V_{LOW}=V_{MIN}+(I_0-I_{MIN})(t_6-t_5)/2$$

Lower threshold magnitude $V_{LOW}$ can also be expressed as:

$$V_{LOW}=V_{MAX}-(I_0-I_{MIN})(t_5-t_3)/2$$

The inductor current $I_L=I_{MIN}$ at time $t_5$, which occurs when $V_0=V_{LOW}$, can be expressed as:

$$I_{MIN}=I_0-(V_{in}-V_{out})(t_6-t_5)/L=I_0-V_{out}(t_5-t_3)/L$$

and therefore $$(V_{in}-V_{out})(t_6-t_5)=V_{out}(t_5-t_3)$$

The above relations can be combined to yield:

$$V_{LOW} = V_{MIN} + V_{out}(I_0 - I_{MIN})(t_5 - t_3)/2(V_{in} - V_{out})$$
$$= V_{MAX} - (I_0 - I_{MIN})(t_5 - t_3)/2$$

and then, $$V_{LOW} = V_{MIN} + (V_{MAX} - V_{MIN})V_{out}/V_{in}$$

which is the same as the expression for $V_{HIGH}$ in both CCM and DCM. Therefore, for CCM, $V_{LOW}=V_{HIGH}$.

Figure 4A:
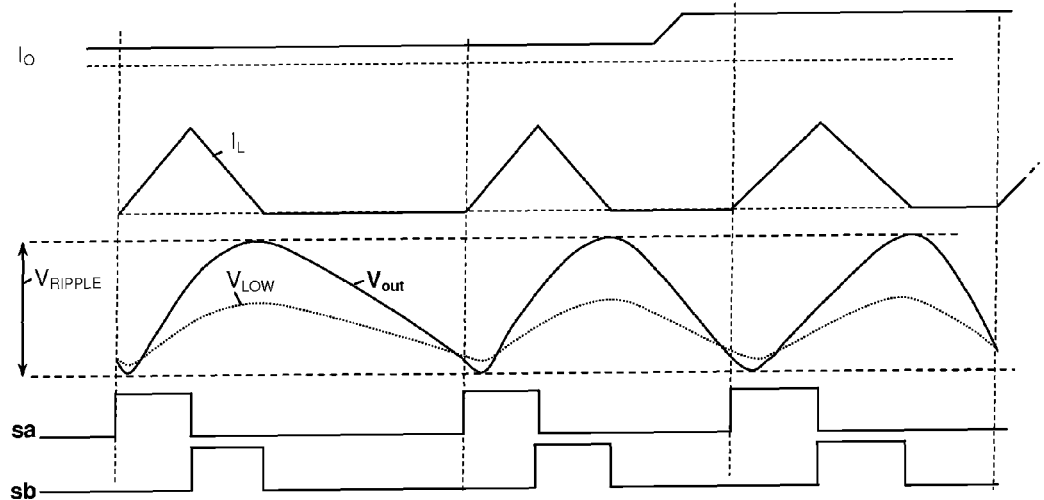
FIGS. 4A-4B are signal waveform diagrams depicting signals within the circuits depicted in FIGS. 1A-1B and FIGS. 2A-2B.
Figure 4B:
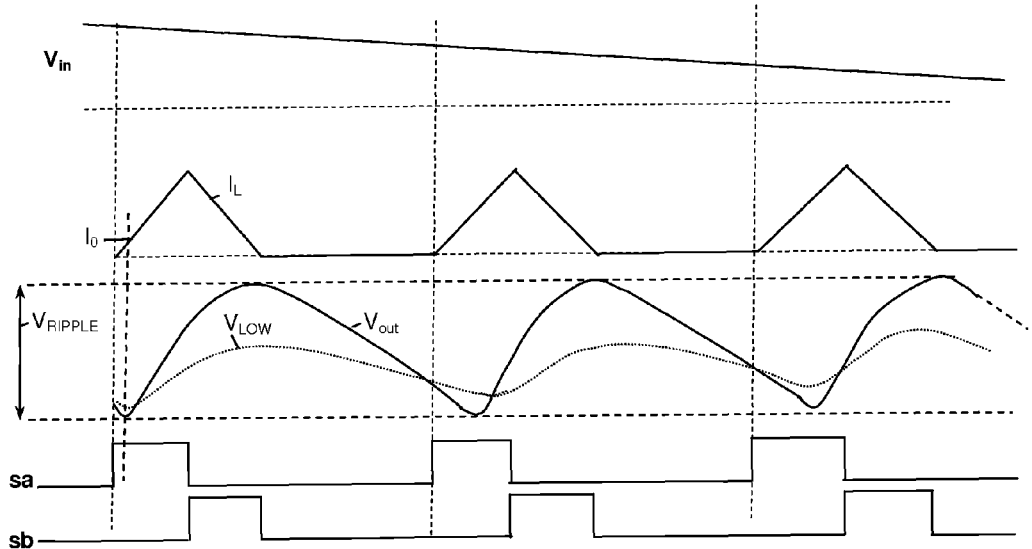

With reference now to FIG. 4A and FIG. 4B, operation of the buck switching voltage regulator circuits of FIG. 1A and FIG. 1B, controller 10A of FIG. 2A and controller 10B of FIG. 1B is illustrated and the calculations used in controllers 10A and 10B to determine switching times as described above are described in further detail below. Only DCM is shown, but the illustration is applicable to CCM operation, as well. FIG. 4A shows operation of the hysteretic converter circuits of the present invention in response to a change in load current $I_0$. As load current $I_0$ increases, threshold voltage $V_{LOW}$ is increased according to the formulas above, causing the charging transistor to turn on progressively earlier. Similarly, FIG. 4B shows operation of the hysteretic converter in response to a decreasing voltage at input source $V_{IN}$, such as operation from a battery that is discharging. The discharge rate is exaggerated to illustrate the effect of the decreasing input voltage on threshold voltage $V_{LOW}$, which is increased to cause the charging transistor to turn on earlier, compensating for the decrease in the voltage of input source $V_{IN}$.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A buck switching voltage regulator circuit, comprising:
   a comparison circuit for providing a first indication when a voltage of an output of the buck switching voltage regulator circuit does not exceed a first threshold magnitude and providing a second indication when the voltage of the output of the buck switching regulator circuit exceeds a second threshold magnitude, wherein the second threshold magnitude is greater than the first threshold magnitude;
   an inductive storage element;
   a switching circuit for coupling the inductive storage element between an input of the buck switching voltage regulator circuit and the output of the buck switching voltage regulator circuit in response to the first indication, and coupling the inductive storage element between the output of the buck switching voltage regulator circuit and a return path of the output of the buck switching voltage regulator circuit in response to the second indication; and
   a control circuit for generating the first threshold magnitude and the second threshold magnitude, such that the first threshold magnitude increases with increases in an output current provided by the output of the buck switching voltage regulator circuit to a load and decreases with decreases in the output current, and wherein the control circuit calculates an indication of the output current and sets the first threshold magnitude in conformity therewith.

2. The buck switching voltage regulator circuit of claim 1, wherein the control circuit further sets the second threshold magnitude in conformity with a value of the output current.

3. The buck switching voltage regulator circuit of claim 1, wherein the control circuit calculates the indication of the output current from a voltage of the output of the buck switching voltage regulator circuit and a time period extending from a beginning of the second indication in a given cycle of the switching circuit and a beginning of the first indication in a next cycle of the switching circuit.

4. The buck switching voltage regulator circuit of claim 3, wherein the control circuit calculates the indication of the output current according to the formula:

$$(V_{in}-V_{out})(t_2-t_0)/2L-C(V_{HIGH}-V_{LOW})/(t_2-t_0)$$

where $V_{in}$ is a voltage of the input of the buck switching regulator circuit, $V_{out}$ is the voltage of the output of the buck switching regulator circuit, C is a capacitance at the output of the buck switching regulator circuit, L is the inductance of the inductive storage element, $t_2$ is a time of the beginning of the second indication in the given cycle, $t_0$ is a time of the beginning of the first indication in the given cycle, $V_{HIGH}$ is a maximum ripple voltage value, and $V_{LOW}$ is a minimum ripple voltage value.

5. The buck switching voltage regulator circuit of claim 3, wherein the control circuit calculates the indication of the output current according to the formula:

$$V_{out}(t_4-t_2)^2/2L(t_5-t_2)-C(V_{HIGH}-V_{LOW})/(t_5-t_2),$$

where $V_{out}$ is the voltage of the output of the buck switching regulator circuit, C is a capacitance at the output of the buck switching regulator circuit. L is the inductance of the inductive storage element, $t_2$ is a time of the beginning of the second indication in the given cycle, $t_5$ is a time of the beginning of the first indication in the next cycle, $V_{HIGH}$ is a maximum ripple voltage value, $V_{LOW}$ is a minimum ripple voltage value, and $t_4$ is a time of the end of the second indication in the given cycle.

6. The buck switching voltage regulator circuit of claim 1, wherein the control circuit measures the output current to provide the indication of the output current.

7. The buck switching voltage regulator circuit of claim 1, wherein the control circuit calculates the first threshold magnitude further in conformity with a difference between a voltage of the input of the buck switching voltage regulator circuit and the voltage of the output of the buck switching voltage regulator circuit.

8. The buck switching voltage regulator circuit of claim 7, wherein the control circuit calculates the first threshold magnitude according to the formula:

$$I_0^2L/2C(V_{in}-V_{out}),$$

where $V_{in}$ is a voltage of the input of the buck switching regulator circuit, $V_{out}$ is the voltage of the output of the buck switching regulator circuit, C is a capacitance at the output of the buck switching regulator circuit, L is the inductance of the inductive storage element, and $I_0$ is the indication of the output current.

9. The buck switching voltage regulator circuit of claim 1, wherein the control circuit is operating in a continuous conduction mode and the indication of output current is a difference between a current delivered to the output of the buck switching voltage regulator circuit and a minimum current in the inductive storage element.

10. The buck switching voltage regulator circuit of claim 1, wherein the control circuit calculates the second threshold magnitude from the voltage of the output of the buck switching voltage regulator circuit and a voltage of the input of the buck switching voltage regulator circuit.

11. The buck switching voltage regulator circuit of claim 10, wherein the control circuit calculates the second threshold magnitude according to the formula:

$$V_{HIGH}=V_{MIN}+(V_{MAX}-V_{MIN})V_{out}/V_{in},$$

where $V_{in}$ is a voltage of the input of the buck switching regulator circuit, $V_{out}$ is the voltage of the output of the buck switching regulator circuit, $V_{HIGH}$ is a maximum ripple voltage value, and $V_{LOW}$ is a minimum ripple voltage value.

12. A buck switching voltage regulator circuit, comprising:
a comparison circuit for providing a first indication when a voltage of an output of the buck switching voltage regulator circuit does not exceed a first threshold magnitude and providing a second indication when the voltage of the output of the buck switching regulator circuit exceeds a second threshold magnitude, wherein the second threshold magnitude is greater than the first threshold magnitude;
an inductive storage element;
a switching circuit for coupling the inductive storage element between an input of the buck switching voltage regulator circuit and the output of the buck switching voltage regulator circuit in response to the first indication, and coupling the inductive storage element between the output of the buck switching voltage regulator circuit and a return path of the output of the buck switching voltage regulator circuit in response to the second indication; and
a control circuit for generating the first threshold magnitude as a waveform at a rate greater than or equal to a switching period of the switching circuit, wherein the first indication is generated repetitively to control a start of the switching period, and wherein the waveform is generated such that the first indication occurs earlier in time within the switching period as an output current provided by the output of the buck switching voltage regulator circuit to a load increases and occurs later in time within the switching period as the output current decreases.

13. A method for regulating the output voltage of a buck switching voltage regulator circuit, comprising:
first comparing a voltage of an output of the buck switching voltage regulator circuit to a first threshold magnitude;
second comparing the voltage of the output of the buck switching voltage regulator circuit to a second threshold magnitude, wherein the second threshold magnitude is greater than the first threshold magnitude;
coupling an inductive storage element between an input of the buck switching voltage regulator circuit and the output of the buck switching voltage regulator circuit when the first comparing indicates that the voltage of the output of the buck switching voltage regulator circuit does not exceed the first threshold magnitude;
coupling the inductive storage element between the output of the buck switching voltage regulator circuit and a return path of the output of the switching voltage regulator circuit when the second comparing indicates that the voltage of the output of the buck switching voltage regulator circuit exceeds the second threshold magnitude; and
controlling values of the first threshold magnitude and the second threshold magnitude, such that the first threshold magnitude increases with increases in output current provided by the output of the buck switching voltage regulator circuit to a load and decreases with decreases in the output current, by calculating an indication of an output current provided by the output of the buck switching voltage regulator circuit to a load and setting the first threshold magnitude in conformity therewith.

14. The method of claim 13, wherein the controlling further comprises setting the second threshold magnitude in conformity with a value of the output current.

15. The method of claim 13, wherein the controlling calculates the indication of the output current from a voltage of the output of the buck switching voltage regulator circuit and a time period extending from a beginning of the second indication in a given cycle of the buck switching voltage regulator circuit and a beginning of the first indication in a next cycle of the buck switching voltage regulator circuit.

16. The method of claim 15, wherein the controlling calculates the indication of the output current according to the formula:

$$(V_{in}-V_{out})(t_2-t_0)/2L-C(V_{HIGH}-V_{LOW})/(t_2-t_0)$$

where $V_{in}$ is a voltage of the input of the buck switching regulator circuit, $V_{out}$ is the voltage of the output of the buck switching regulator circuit, C is a capacitance at the output of the buck switching regulator circuit, L is the inductance of the inductive storage element, $t_2$ is a time of the beginning of the second indication in the given cycle, $t_0$ is a time of the beginning of the first indication in the given cycle, $V_{HIGH}$ is a maximum ripple voltage value, and $V_{LOW}$ is a minimum ripple voltage value.

17. The method of claim 15, wherein the controlling calculates the indication of the output current according to the formula:

$$V_{out}(t_4-t_2)^2/2L(t_5-t_2)-C(V_{HIGH}-V_{LOW})/(t_5-t_2),$$

where $V_{out}$ is the voltage of the output of the buck switching regulator circuit, C is a capacitance at the output of the buck switching regulator circuit, L is the inductance of the inductive storage element, $t_2$ is a time of the beginning of the second indication in the given cycle, $t_5$ is a time of the beginning of the first indication in the next cycle, $V_{HIGH}$ is a maximum ripple voltage value, $V_{LOW}$ is a minimum ripple voltage value, and $t_4$ is a time of the end of the second indication in the given cycle.

18. The method of claim 13, further comprising measuring the output current to provide the indication of the output current.

19. The method of claim 13, wherein the controlling calculates the first threshold magnitude further in conformity with a difference between a voltage of the input of the buck switching voltage regulator circuit and the voltage of the output of the buck switching voltage regulator circuit.

20. The method of claim 19, wherein the controlling calculates the first threshold magnitude according to the formula:

$$I_0^2L/2C(V_{in}-V_{out}),$$

where $V_{in}$ is a voltage of the input of the buck switching regulator circuit, $V_{out}$ is the voltage of the output of the buck switching regulator circuit, C is a capacitance at the output of the buck switching regulator circuit, L is the inductance of the inductive storage element, and $I_0$ is the indication of the output current.

21. The method of claim 13, wherein the buck switching voltage regulator circuit is operating in a continuous conduction mode and the indication of output current is a difference between a current delivered to the output of the buck switching voltage regulator circuit and a minimum current in the inductive storage element.

22. The method of claim 13, wherein the controlling calculates the second threshold magnitude from the voltage of the output of the buck switching voltage regulator circuit and a voltage of the input of the buck switching voltage regulator circuit.

23. The method of claim 22, wherein the controlling calculates the second threshold magnitude according to the formula:

$$V_{HIGH}=V_{MIN}+(V_{MAX}-V_{MIN})V_{out}/V_{in},$$

where $V_{in}$ is a voltage of the input of the buck switching regulator circuit, $V_{out}$ is the voltage of the output of the buck switching regulator circuit, $V_{HIGH}$ is a maximum ripple voltage value, and $V_{LOW}$ is a minimum ripple voltage value.

24. A method for regulating the output voltage of a buck switching voltage regulator circuit, comprising:
   first comparing a voltage of an output of the buck switching voltage regulator circuit to a first threshold magnitude;
   second comparing the voltage of the output of the buck switching voltage regulator circuit to a second threshold magnitude, wherein the second threshold magnitude is greater than the first threshold magnitude;
   coupling an inductive storage element between an input of the buck switching voltage regulator circuit and the output of the buck switching voltage regulator circuit when the first comparing indicates that the voltage of the output of the buck switching voltage regulator circuit does not exceed the first threshold magnitude;
   coupling the inductive storage element and between the output of the buck switching voltage regulator circuit and a return path of the output of the switching voltage regulator circuit when the second comparing indicates that the voltage of the output of the buck switching voltage regulator circuit exceeds the second threshold magnitude; and
   generating the first threshold magnitude as a waveform at a rate greater than or equal to a switching period of the switching circuit, wherein the first indication is generated repetitively to control a start of the switching period, and wherein the waveform is generated such that the first indication occurs earlier in time within the switching period as an output current provided by the output of the buck switching voltage regulator circuit to a load increases and occurs later in time within the switching period as the output current decreases.

* * * * *